US011910496B2

(12) United States Patent
Schlipf

(10) Patent No.: US 11,910,496 B2
(45) Date of Patent: Feb. 20, 2024

(54) ELECTRICAL TUBULAR HEATING ELEMENT WITH CONNECTING PIN AND MANUFACTURING METHOD FOR ELECTRICAL TUBULAR HEATING ELEMENT WITH CONNECTING PIN

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 507 days.

(21) Appl. No.: 17/070,018

(22) Filed: Oct. 14, 2020

(65) Prior Publication Data

US 2021/0112633 A1 Apr. 15, 2021

(30) Foreign Application Priority Data

Oct. 15, 2019 (DE) ..................... 10 2019 127 689.6

(51) Int. Cl.
*H05B 3/46* (2006.01)
*H05B 3/03* (2006.01)
(Continued)

(52) U.S. Cl.
CPC ............. *H05B 3/46* (2013.01); *H05B 3/0019* (2013.01); *H05B 3/03* (2013.01); *H05B 3/06* (2013.01); *H05B 3/42* (2013.01)

(58) Field of Classification Search
CPC .......... H05B 3/46; H05B 3/0019; H05B 3/03; H05B 3/06; H05B 3/42
See application file for complete search history.

(56) References Cited

U.S. PATENT DOCUMENTS 5,247,158 A * 9/1993 Steinhauser ............. H05B 3/46 219/544
2014/0263282 A1* 9/2014 Riley ....................... H05B 3/06 219/546
(Continued)

FOREIGN PATENT DOCUMENTS

CN 103053218 A 4/2013
CN 108430119 A 8/2018
EP 3567984 A1 * 11/2019 ............... H05B 1/02

OTHER PUBLICATIONS

Chinese Office Action dated Sep. 5, 2022 in Chinese patent application No. 202011096382.4.

*Primary Examiner* — Nathaniel E Wiehe
*Assistant Examiner* — Keith Brian Assante
(74) *Attorney, Agent, or Firm* — Panitch Schwarze Belisario & Nadel LLP

(57) ABSTRACT

An electrical tubular heating element is disclosed with a tubular metal sheath, in whose interior at least one electrical heating element, which is constructed as a resistive wire, arranged electrically insulated from the tubular metal sheath at least in sections, in which the electrical heating element has a base body, which consists of one or more sections of the electrical heating element each with essentially constant cross section, and two end sections and that at least one end section of at least one of the electrical heating elements is subjected to a shape-changing process, so that the cross section of the end section is reduced at least in sub-areas of the end section in comparison to the cross section in each section of the base body. A method for manufacturing such an electrical tubular heating element is also disclosed.

19 Claims, 5 Drawing Sheets

(51) Int. Cl.

| | |
|---|---|
| ***H05B 3/00*** | (2006.01) |
| ***H05B 3/06*** | (2006.01) |
| ***H05B 3/42*** | (2006.01) |

(56) References Cited

U.S. PATENT DOCUMENTS

| | | | | |
|---|---|---|---|---|
| 2014/0270729 | A1* | 9/2014 | DePiano | A24F 40/46<br>392/397 |
| 2018/0235033 | A1* | 8/2018 | Schlipf | H05B 3/40 |
| 2018/0302954 | A1* | 10/2018 | Lutz, II | H05B 3/82 |

* cited by examiner 35
37
32
30

35
36
35a
30a
31
30

35
37
32
30

45
46
45a
47
40a
40
41

45
46
45a
47
40a
40
41

45
46
47
40a
45a
40
41

45
40

50
51
52
55
56
57
50a
55a
70
75
60
61
62
65
66
67
60a
65a

ELECTRICAL TUBULAR HEATING ELEMENT WITH CONNECTING PIN AND MANUFACTURING METHOD FOR ELECTRICAL TUBULAR HEATING ELEMENT WITH CONNECTING PIN

CROSS-REFERENCE TO RELATED APPLICATION

This application claims priority under 35 U.S.C. § 119 to German Patent Application No. 10 2019 127 689.6, filed on Oct. 15, 2019, the disclosure of which is incorporated herein by reference in its entirety.

BACKGROUND OF THE INVENTION

The preferred invention relates to an electrical tubular heating element with connecting pin with the features of the claimed and described device and a method for manufacturing such an electrical tubular heating element.

Electrical tubular heating elements are a solution that has been known and proven for many years to provide electric heat. In this category of electrical heating devices, the electrical heating element, which, in many cases, is a resistive wire or has a resistive wire, is arranged within a tubular metal sheath and is electrically insulated from this sheath by a good heat-conducting, but electrically insulating material, such as, e.g., magnesium oxide or a ceramic. The term electrical tubular heating element is used here for all electrical heating devices constructed in this way without further internal differentiation and thus includes, in particular, also heating cartridges that have connections on only one side.

Here it is known to manufacture the electrical contact between the electrical heating element and the conductors of the supply cable via the connecting pin, in order to limit the heat generation as much as possible to the areas of the electrical tubular heating element, in which it is desired and in order to optimize the current feed to the electrical heating element. Naturally, it is then important to manufacture an electrical contact between the electrical heating element and connecting pin in a process-assured way to create a reliable connection. Problems here are, in particular, the effects of transition resistances and local contact problems that can have significant effects, especially for small available contact surfaces.

Problems for the process-assured guarantee of such an electrical contact to create a reliable connection can then be produced, in particular, when the electrical tubular heating element—especially with respect to its cross-sectional surface area—must be constructed in a particularly small construction. In such cases, especially when the electrical heating element is constructed as an elongated heating element, the design can function by means of butt welding a connecting pin made from pure nickel, but this again leads to the point-wise increase in power, which leads to problems.

BRIEF SUMMARY OF THE INVENTION

The task of the invention consists in preparing an electrical tubular heating element with connecting pin with improved processing assurance or reliable processing for the manufacture of the electrical contact between the electrical heating element and connecting pin and also a method for manufacturing such an electrical tubular heating element. This task is achieved by an electrical tubular heating element with the features of the device described herein and method for manufacturing an electrical tubular heating element with the features described and claimed herein. Advantageous refinements of the invention are the subject matter of the respective dependent claims.

The electrical tubular heating element according to the invention has a tubular metal sheath, in whose interior at least one electrical heating element, which is constructed as a resistive wire, is arranged electrically insulated at least in sections from the tubular metal sheath, which can be achieved by embedding the electrical heating element in electrically insulating material such as, e.g., magnesium oxide or a ceramic.

The formulation "at least in sections" is used here, in particular, because the tubular metal sheath can be used as a return line in many embodiments and for this purpose, a conductive connection must be manufactured between one end of the electrical heating element and the tubular metal sheath. In particular, when all connections of the electrical heating element are led out from the tubular metal sheath on the end side, the electrical heating element is completely electrically insulated from the tubular metal sheath.

It is essential to the preferred invention that the electrical heating element has a base body, which consists of one or more sections of the electrical heating element each with essentially constant cross section, and two end sections and that at least one end section of at least one of the electrical heating elements is subjected to a shape-changing machining process, so that the cross section of the end section is reduced at least in sub-areas of the end section, especially at the end side of the end section, in comparison to the cross section in each section of the base body. This measure makes it possible to manufacture a contact to a connecting wire or connecting pin, which is realized not only via end faces, but can also include side surfaces, without increasing the cross section of the whole arrangement.

It is optional, but in many cases advantageous if the electrical tubular heating element is completely or partially compacted.

The base body is here formed by the wire elements in the area between the end sections of the resistive wire. Several sections of the base body with essentially constant cross section then occur, in particular, if different sections of the electrical tubular heating element are compacted with different intensities and therefore the resistive wire is deformed to different degrees in these sections. The meaning of the term "cross section" is well understood and directly if a resistive wire is viewed in the elongated state as an essentially cylindrical system with a cylinder axis running parallel to the profile direction of the resistive wire, perpendicular to the cross-sectional surfaces. Obviously, these views can also be transferred directly to a connecting wire or connecting pin.

The invention can be used in an especially advantageous way for linear, in particular, straight or elongated electrical heating elements.

Possibilities for the shape-changing machining of the end sections of the electrical heating element constructed as resistive wire, with which such cross-sectional reductions are possible, are, in particular, methods for metal-cutting machining, but also hammering and pressing methods.

This involves machining of the heating element, that is, the resistive wire itself, which is realized on one of its end sections and reduces the cross section. It is to be noted that this approach is initially diametrically opposed to the typical method for reducing the heating output in an unheated area by increasing the cross section.

Reducing the cross section is associated with preparing additional interaction surfaces for the manufacturing of an electrical contact to the connecting wire or connecting pin for constant installation space requirements for the electrical tubular heating element, which has directly positive effects on the process assurance, even if an end-side interaction surface can be reduced.

In an especially preferred way, the invention can be used in cases in which at least one connecting wire or connecting pin is present, which is in electrically conductive connection with a machined end section of the electrical heating element, and indeed within the tubular metal sheath. The connection of the electrical heating element to the electrical supply cable is realized in these cases not directly, but instead via the connecting wire or connecting pin, which enables, in particular, an unheated end area of the electrical tubular heating element.

In an especially preferred way, a refinement of such a configuration, in which the electrically conductive connection to the machined end section of the electrical heating element is realized via an end section of the connecting wire or connecting pin, which is machined such that it has a complementary shape to the shape of the end section of the electrical heating element, with which it is connected. In this way, the contact surface can be maximized for forming the electrical contact and accordingly the effect of any local problem points or problem areas can be minimized. In addition, in this way, the mechanical stability of the connection can also be improved, for example, with respect to vibrations.

Stability that has been increased in this way is also advantageous, however, in cases in which the electrical tubular heating element is exposed to a plurality of temperature cycles that can apply loads to the contact position in particular due to the different coefficients of thermal expansion of different materials.

In principle, magnesium oxide in powder form or preferably also as a granulate can be used for the electrical insulation of the assembly, which is formed on one side from the electrical heating element and on the other side from the connecting pin. According to one refinement of the invention that is advantageous for some geometries, however, it can also be provided that the electrical insulation of the assembly, which is formed on one side from the electrical heating element and on the other side from the connecting wire or connecting pin, is formed from the tubular metal sheath by pushed-on ceramic tubes. With respect to manufacturing, this is a big advantage especially for electrical tubular heating elements with small diameters, because the filling with a material in powder or granulate form, e.g., magnesium oxide, is often difficult in these cases.

Here it is especially preferred if this electrical insulation is formed by a single pushed-on ceramic tube, which requires, however, that there not be any fluctuations in distance that are too big between the outer contour of the assembly and the tubular metal sheath over the volume that must be filled by the electrical insulation, which is required by the shape according to the invention for the end sections of the electrical heating element.

It is to be noted, however, that in any case, when the electrical tubular heating element is compacted, the ceramic tubes are regularly crushed to form a powder and thus are often no longer detectable as a tube in the compacted end products.

If the connecting wire or connecting pin has a base body, whose cross section corresponds at least in one section to the cross section of a section of the base body of the electrical heating element, the tubular heating element has an essentially unheated area, without which this area would require a significant amount of additional installation space.

Here it is especially preferred if the outer circumferential line of the assembly formed on one side from the electrical heating element and on the other side from connecting wires or connecting pins is constant across the entire area of this assembly, which is arranged within the tubular metal sheath.

In particular, a preferred construction of a reduction of the cross section of the end section is given, if the cross section of the end section tapers in the direction toward the end of the electrical heating element in steps or continuously. For such a construction, an abrupt transition between the unheated and heated areas of the electrical tubular heating element is then also avoided.

As an alternative, the end section can also be formed, for example, by a projection on an end-side end surface of the base body. If such a projection also has an undercut or a thread, the construction and continuity of the electrical connection can also be supported mechanically, which leads to especially reliable connections especially in connection with complementary constructions of the end section of the connecting wire or connecting pin.

While the previously discussed examples for a reduction of the cross section can require a change to the outer contour of the end section relative to the cross section of the adjacent section of the base body, it can also be achieved if the outer contour of the end section corresponds to the outer contour of a section of the base body, but the end section has a recess or opening starting from the end-side end of the electrical heating element. Advantageously, this recess or opening can have an undercut or a thread on its side and therefore can support the electrical connection mechanically.

The method according to the invention for manufacturing an electrical tubular heating element has the steps

- preparing a tubular metal sheath, a connecting wire or connecting pin, and also an electrical heating element, which is constructed as a resistive wire and a base body, which consists of one or more sections of the electrical heating element each with an essentially constant cross section,
- connecting the electrical heating element with the connecting wire or connecting pin,
- arranging at least the electrical heating element in an interior of the tubular metal sheath, and
- electrically insulating at least sections of the electrical heating element relative to the tubular metal sheath, wherein the last three steps do not necessarily have to be performed in the specified order.

It is essential for the method according to the invention that at least one end section at least of one of the electrical heating elements is subjected to a shape-changing machining process, so that the cross section of the end section is reduced at least in sub-areas of the end section in comparison to the cross section in each section of the base body. Through this measure, it is made possible to manufacture a contact to a connecting wire or connecting pin, which is realized not only via end surfaces, but can also include side surfaces, without increasing the cross section of the overall arrangement.

In one advantageous refinement of the method, before connecting the electrical heating element with the connecting wire or connecting pin, at least one end section at least of a connecting wire or connecting pin is subjected to a shape-changing machining process that is complementary to the shape-changing machining process of the end section of the electrical heating element, wherein an especially reliable electrical and mechanical contact is made possible between the electrical heating element on one side and the connecting wire or connecting pin on the other side.

It is further viewed as advantageous that the electrical heating element is arranged together with the connecting wire or connecting pin as an assembly in the interior of the tubular metal sheath, which enables a more controlled manufacture of the electrical and mechanical contact and thus contributes to the process-assured or reliable process and low-waste manufacture.

It is especially preferred when the electrical insulation at least of sections of the electrical heating element from the tubular metal sheath is realized by pushing on ceramic tubes, which significantly simplifies the manufacturing process. It is especially preferred here if the electrical heating element is electrically insulated together with sections of the connecting wire or connecting pin from the tubular metal sheath, by a single ceramic tube being pushed on. This requires, however, that the outer dimension of the assembly made from the electrical heating element and connecting wires or connecting pins does not have great variation.

The shape-changing machining can be realized by a metal-cutting process, especially milling, turning, or grinding, but also pressing or hammering.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
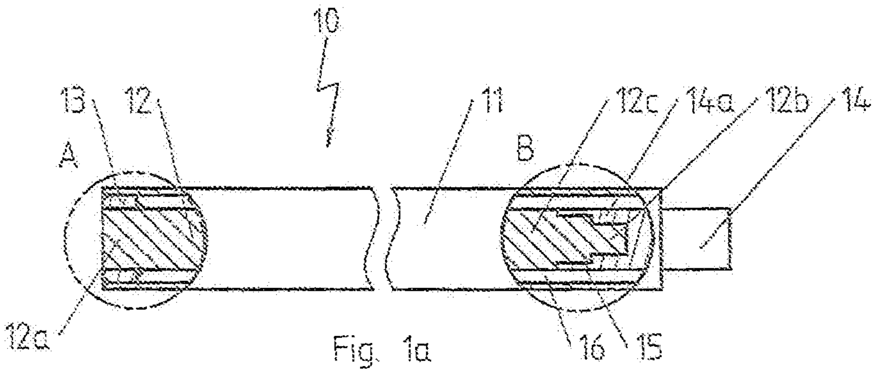
FIG. 1*a* is a side elevational, partial cross-sectional view of a first embodiment of an electrical tubular heating element in accordance with the preferred invention.

FIG. 1*a* shows an electrical tubular heating element 10 with tubular metal sheath 11 and electrical heating element

12. The electrical heating element 12 is constructed as a linear, elongated resistive wire, which runs concentric to the tube axis within the tubular metal sheath 11.

Figure 1B:
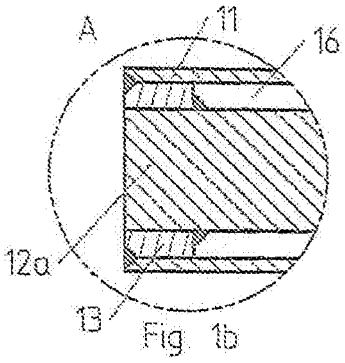
FIG. 1*b* is a detail cross-sectional view of a first detail of the electrical tubular heating element from FIG. 1*a*, taken from within circle A of FIG. 1*a;*
Figure 1C:
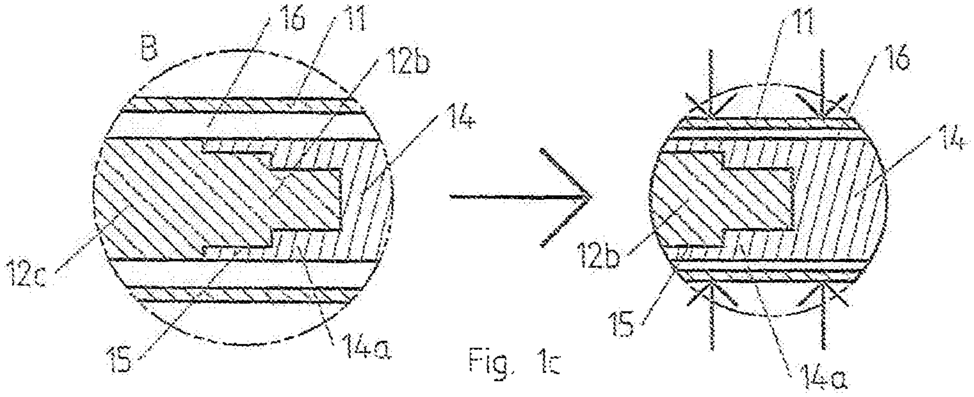
FIG. 1*c* is a detail cross-sectional view of a second detail of the electrical tubular heating element from FIG. 1*a*, taken from within circle B of FIG. 1*a* before and after the compacting process.

The electrical heating element 12 has two end sections 12*a*, 12*b*, which are shown enlarged in the detail views of details A and B according to FIG. 1*b* and FIG. 1*c*, respectively, and a base body 12*c* with essentially constant cross section. Especially in cases in which an electrical tubular heating element is compacted to very different degrees in different sections, the different compacting can lead to different changes of the electrical heating element, which then leads to a base body with multiple sections corresponding to the zones of different compaction with essentially constant cross section.

As the detail A shown in FIG. 1*b* illustrates, the end section 12*a* is welded with an electrically conductive ring 13, which is welded on its side with the tubular metal sheath 11. Accordingly, there is here an electrical connection between the end section 12*a* of the electrical heating element 12 and the tubular metal sheath 11; the tubular metal sheath 11 is used as a return line.

As the detail B shown in FIG. 1*c* before and after the compacting of the electrical tubular heating element 10 illustrates, the end section 12*b* of the electrical heating element 12 is, in contrast, subjected to a shape-changing machining process, so that its cross section is reduced, namely stepped. The stepped end section 12*b* of the electrical heating element 12 engages in a complementary stepped recess 15 that starts from the end side of the connecting wire or connecting pin 14 facing the heating element 12 and that is arranged in its end section 14*a*, so that there is an electrical and mechanical contact between the electrical heating element 12 and the connecting wire or connecting pin 14. At the same time, the outer contours of the electrical heating element 12 and the connecting wire or connecting pin 14 are adapted to each other so that their outer surfaces abut flush against each other. Furthermore, a section of the connecting pin 14 or its base body 14*b* emerges from the tubular metal sheath 11.

The sections of the electrical heating element 12 located within the tubular metal sheath 11, with the exception of the end section 12*a* and the connecting pin 14, are electrically insulated from the tubular metal sheath 11 by a single ceramic tube 16.

The manufacture of the electrical tubular heating element 10 is to be performed in an extremely simple way. The end section 12*b* of the electrical heating element 12 is subjected to a shape-changing machining process, for example, turned, in order to generate the stepped contour. The connecting pin 14 is drilled in its end section 14*a* on its end side, in order to form the complementary recess 15.

Then the ring 13 can be placed on the end section 12*a*, the end section 12*b* can be inserted into the complementary recess 15, and the assembly formed in this way—optionally after welding or soldering the components to each other—can be inserted into the tubular metal sheath 11. Then the ring 13 is welded with the tubular metal sheath 11 and the ceramic tube 16 is pushed on, before the electrical tubular heating element 10 is completed by compacting. It should still be noted that if one wants to eliminate the welding or soldering, a compacting process can already produce a usable press contact.

Figure 2:
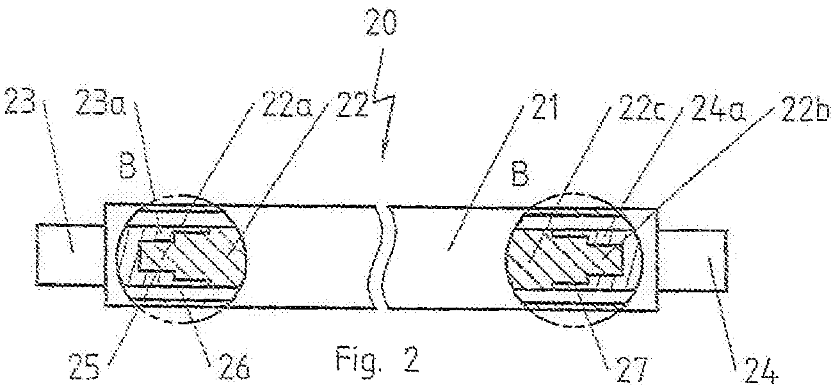
FIG. 2 is a side elevational, partial cross-sectional view of a second embodiment of an electrical tubular heating element in accordance with the preferred invention.

The electrical tubular heating element 20 shown in FIG. 2 has a tubular metal sheath 21 and an electrical heating element 22 with end sections 22*a*, 22*b*, which are both subjected to shape-changing machining processes in this example analogous to the end section 12*b* of the electrical heating element 12 of the electrical tubular heating element 10, so that their cross sections are each reduced by steps at the ends of the electrical heating element. Here, two connecting wires or connecting pins 23, 24 are now present, which have end sections 23*a*, 24*a* that are provided with recesses 25, 27 in a way analogous to connecting pin 14 or its end section 14*a* with shape-changing machining. The complete electrical insulation of the assembly consisting of the electrical heating element 22 and connecting pin 23, 24 relative to the tubular metal sheath 21 in this embodiment is guaranteed by a single ceramic tube 26.

Figures 3A, 3B, 3C, 4A, 4B, 4C, 4D:
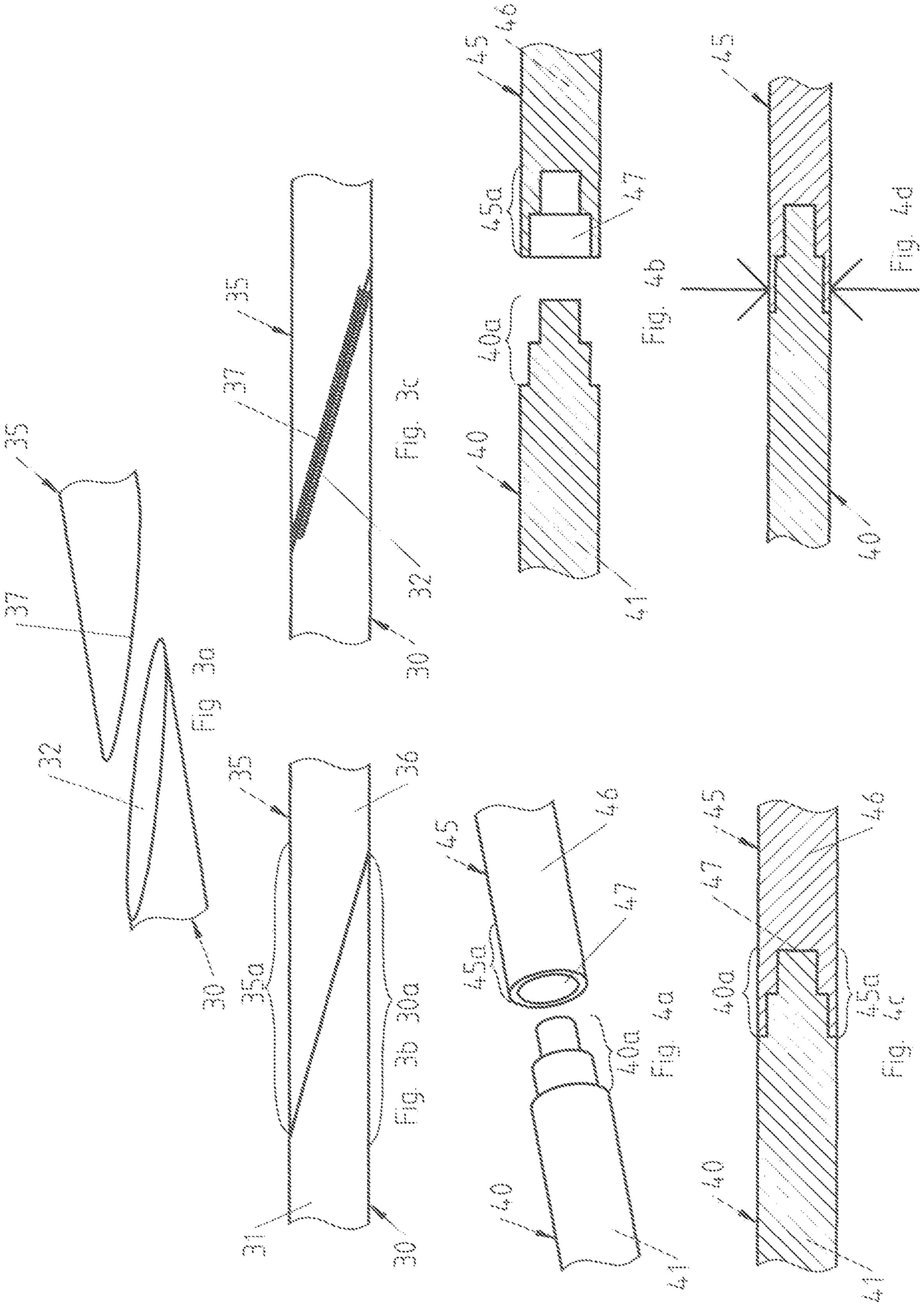
FIG. 3*a* is a side perspective, fragmentary schematic view of a first step for connecting an electrical heating element and a connecting wire according to a first preferred procedure.
FIG. 3*b* is a side elevational, fragmentary schematic view of a second step for connecting the electrical heating element and the connecting wire according to the first procedure of FIG. 3*a;*
FIG. 3*c* is a side elevational, fragmentary schematic view of a third step for connecting the electrical heating element and the connecting wire according to the first procedure of FIG. 3*a;*
FIG. 4*a* is a side perspective, fragmentary schematic view of a first step for connecting an electrical heating element and a connecting wire according to a second preferred procedure.
FIG. 4*b* is a cross-sectional view of the step from FIG. 4*a*, taken generally along a longitudinal axis of the electrical heating element and connecting wire of FIG. 4*a;*
FIG. 4*c* is a cross-sectional view of a second step for connecting the electrical heating element and the connecting wire according to the second procedure, taken generally along a longitudinal axis of the electrical heating element and connecting wire of FIG. 4*a;*
FIG. 4*d* is a cross-sectional view of a third step for connecting the electrical heating element and the connecting wire according to the second procedure, taken generally along a longitudinal axis of the electrical heating element and connecting wire of FIG. 4*a;*

For the manufacturing of the connection between an electrical heating element 30 and a connecting wire or connecting pin 35, whose base bodies 31, 36 have the same cross section, shown in FIGS. 3*a* to 3*c*, as can be seen particularly well in FIG. 3*a*, the end section 30*a* of the electrical heating element 30 and the end section 35*a* of the connecting wire or connecting pin 35 are each angled at the same cut angle in the same cutting direction. Accordingly, in these end sections 30*a*, 35*a* the cross sections are each reduced in comparison to the respective base body by shape-changing machining.

The contact surfaces 32, 37 generated in this way can then be placed one above the other in a precisely fitting way, as FIG. 3*b* shows, and are welded with each other, as can be seen in FIG. 3*c*. It can be seen immediately that through this procedure, the contact surface is increased significantly in comparison to an abutting, end-side contact, which considerably reduces the relevance of any local contact problems.

For the manufacturing of the connection between an electrical heating element 40 and a connecting wire or connecting pin 45, whose base bodies 41, 46 have the same cross section, shown in FIGS. 4*a* to 4*d*, as can be seen particularly well in FIGS. 4*a* and 4*b*, the end section 40*a* of the electrical heating element 40 is constructed stepped by radial removal of material of the resistive wire, while the end section 45*a* of the connecting wire or connecting pin 45 has a complementary stepped recess 47, which starts from the end side of the connecting wire or connecting pin 45. Accordingly, the cross sections are reduced in comparison to the cross section of the base body 41, 46 by shape-changing machining also in the end sections 40*a*, 45*a*.

Accordingly, the end section 40*a* of the electrical heating element 40 can be inserted into the recess 47 of the connecting wire or connecting pin 45, as shown in FIG. 4*c*, and can then be guaranteed by compacting the electrical contact, as shown in FIG. 4*d*.

Of course, such an arrangement can also be realized with the roles swapped, i.e., a stepped recess extending into an electrical heating element and starting from an end side of this electrical heating element for receiving a complementary stepped end section of the connecting wire or connecting pin. The selection of one of these alternatives can be motivated, for example, by the materials actually being used and their behavior during machining.

Figures 5A, 5B, 5C, 6A, 6B, 6C:
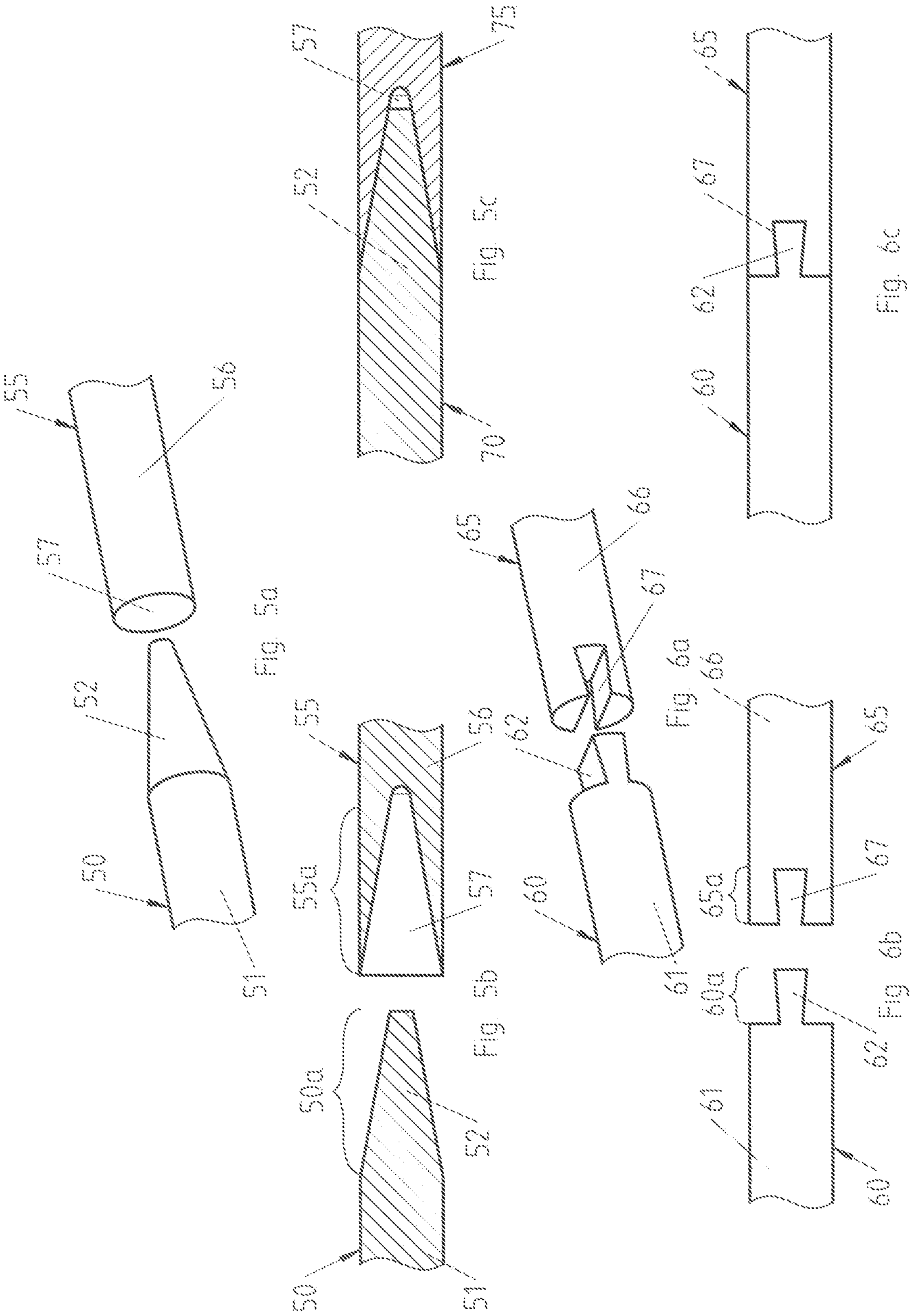
FIG. 5*a* is a side perspective, fragmentary schematic view of a first step for connecting an electrical heating element and a connecting wire according to a third preferred procedure.
FIG. 5*b* is a cross-sectional view of the step from FIG. 5*a*, taken generally along a longitudinal axis of the electrical heating element and connecting wire of FIG. 5*a;*
FIG. 5*c* is a cross-sectional view of a second step for connecting the electrical heating element and the connecting wire according to the third procedure, taken generally along a longitudinal axis of the electrical heating element and connecting wire of FIG. 5*a;*
FIG. 6*a* is a side perspective, fragmentary schematic view of a first step for connecting an electrical heating element and a connecting wire according to a fourth preferred procedure.
FIG. 6*b* is a side elevational view of the step from FIG. 6*a;*
FIG. 6*c* is a side elevational view of a second step for connecting the electrical heating element and the connecting wire according to the fourth procedure of FIG. 6*a;*

For the manufacturing of the connection between an electrical heating element 50 and a connecting wire or connecting pin 55, whose base bodies 51, 56 have the same cross section, shown in FIGS. 5*a* to 5*c*, as can be seen particularly well in FIGS. 5*a* and 5*b*, the end section 50*a* of the electrical heating element 50 is constructed tapering conically by radial removal of material of the resistive wire, while the end section 55*a* of the connecting wire or connecting pin 55 has a complementary conically tapering recess 57, which starts from the end side of the connecting wire or connecting pin 55. Accordingly, the cross sections are reduced in comparison to the cross section of the base body 51, 56 by shape-changing machining also in the end sections 50*a*, 55*a*.

Accordingly, the end section 50*a* of the electrical heating element 50 can be inserted into the recess 57 of the connecting wire or connecting pin 55, as shown in FIG. 5*c*, and then guaranteed, for example, by compacting the electrical contact.

Of course, this arrangement can also be realized with the roles of electrical heating element on one side and connecting wire or connecting pin on the other side reversed.

For the manufacturing of the connection between an electrical heating element 60 and a connecting wire or connecting pin 65, whose base bodies 61, 66 have the same cross section, shown in FIGS. 6*a* to 6*c*, as can be seen particularly well in FIGS. 6*a* and 6*b*, the end section 60*a* of the electrical heating element 60 is shaped by removal of material of the resistive wire into a projection 62, which also has, in this example, an undercut. The end section 65*a* of the connecting wire or connecting pin 65 has a complementary constructed groove 67, which starts from the end side of the connecting wire or connecting pin 55.

Accordingly, the end section 60*a* of the electrical heating element 60 or its projection 62 can be inserted into the groove 67 of the connecting wire or connecting pin 65, as shown in FIG. 6*c*.

Of course, this arrangement can also be realized with the roles of electrical heating element on one side and connecting wire or connecting pin on the other side reversed.

Figure 7C:
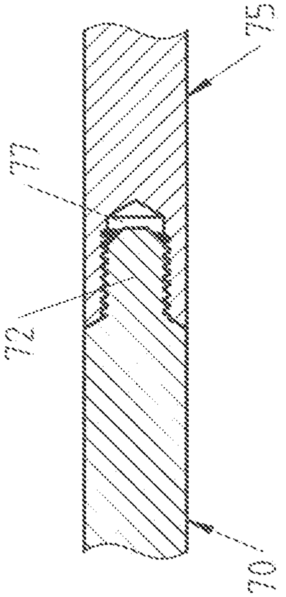
FIG. 7*c* is a cross-sectional view of a second step for connecting the electrical heating element and the connecting wire according to the fifth procedure, taken generally along a longitudinal axis of the electrical heating element and connecting wire of FIG. 7*a;*
Figure 7A:
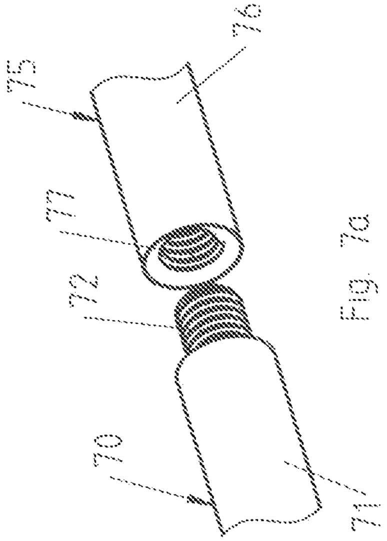
FIG. 7*a* is a side perspective, fragmentary schematic view of a first step for connecting an electrical heating element and a connecting wire according to a fifth preferred procedure.
Figure 7B:
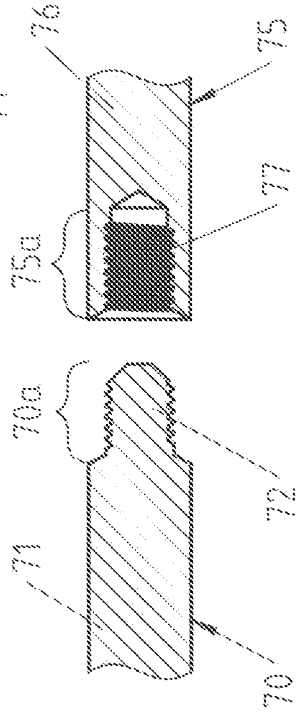
FIG. 7*b* is a cross-sectional view of the step from FIG. 7*a*, taken generally along a longitudinal axis of the electrical heating element and connecting wire of FIG. 7*a*

For the manufacturing of the connection between an electrical heating element 70 and a connecting wire or connecting pin 75, whose base bodies 71, 76 have the same cross section, shown in FIGS. 7*a* to 7*c*, as can be seen particularly well in FIGS. 7*a* and 7*b*, the end section 70*a* of the electrical heating element 70 is constructed by removal of material of the resistive wire to form a cylindrical projection 72, in which a thread is formed. The end section 75*a* of the connecting wire or connecting pin 75 has a complementary constructed hole 77, which starts from the end side of the connecting wire or connecting pin 65, and in which a matching counter-thread is cut.

Accordingly, the end section 70*a* of the electrical heating element 70 or its projection 72 can be screwed into the hole 77 of the connecting wire or connecting pin 75, as shown in FIG. 6*c*. Also for this connection, the roles of electrical heating element 70 and connecting wire or connecting pin 75 can be reversed.

FIGS. 8*a* to 8*e* show three different procedures for the shape-changing machining of an end section 80*a* of an electrical heating element 80, which is formed by a heating element that, however, can be used in the same way on connecting wires or connecting pins.

Figure 8A:
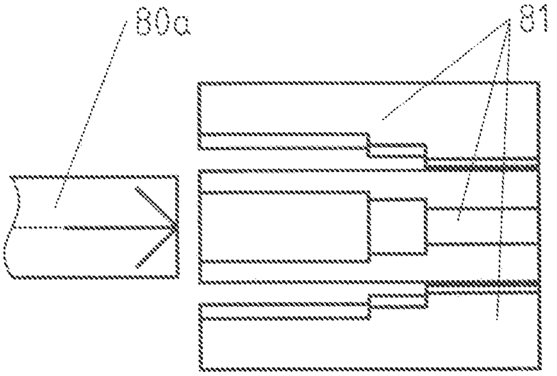
FIG. 8*a* is a side elevational first schematic view of a first way to modify a cross section of the electrical heating element of the preferred embodiments.
Figure 8B:
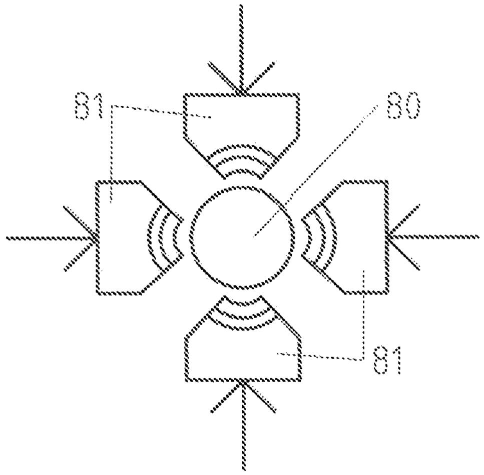
FIG. 8*b* is a front elevational, second schematic view of the first way to modify the cross section of the electrical heating element from FIG. 8*a;*
Figure 8C:
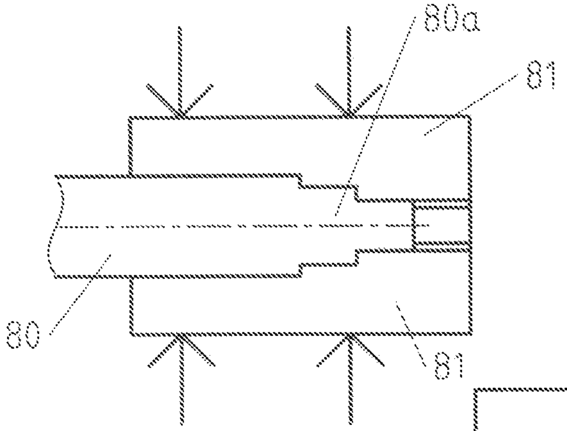
FIG. 8*c* is a side elevational, third schematic view of the first way to modify the cross section of the electrical heating element from FIG. 8*a;*

FIGS. 8*a* to 8*c* show, as a first variant, the hammering of a specified profile. In FIG. 8*a*, the hammering dies 81 are shown opened up in cross section, before the electrical heating element 80 is inserted. In FIG. 8*b*, the arrangement of the hammering dies 81 and inserted electrical heating element 80 is shown from above. In FIG. 8*c*, the state of this arrangement during the hammering process can be seen.

Figure 8D:
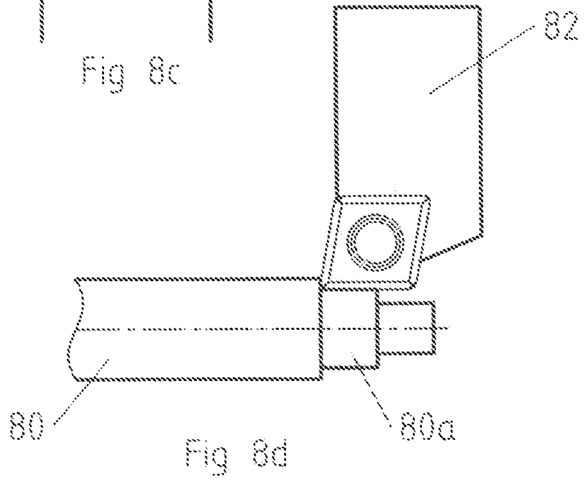
FIG. 8*d* is a side elevational schematic view of a second way to modify the cross section of the electrical heating element from FIG. 8*a*.
Figure 8E:
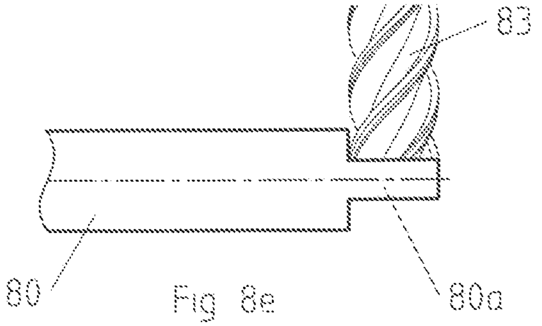
FIG. 8*e* is a side elevational schematic view of a third way to modify the cross section of the electrical heating element from FIG. 8*a*.

FIG. 8*d* illustrates the metal-cutting machining of the electrical heating element 80 or of its end section 80*a* by turning with a turning tool 82 shown schematically; FIG. 8*e* illustrates the metal-cutting machining of the electrical heating element 80 or its end section 80*a* by turning with a milling tool 83 shown schematically.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10, 20 Tubular heating element
11, 21 Metal sheath
12, 22, 30, 40, 50, 60, 70,
80 Electrical heating element
12*a*, 12*b*, 22*a*, 22*b*, 30*a*,
40*a*, 50*a*, 60*a*, 70*a*, 80*a* End section
12*c*, 22*c*, 31, 36, 41, 46,
51, 56, 61, 66, 71, 76 Base body
13 Ring
14, 23, 24, 35, 45, 55, 65,
75, 85 Connecting wire or connecting pin
14*a*, 23*a*, 24*a*, 35*a*, 45*a*,
55*a*, 65*a*, 75*a* End section
15, 25, 27, 47, 57 Recess
16, 26 Ceramic tube
32, 37 Contact surface
62, 72 Projection
67 Groove
77 Hole
81 Hammering die
82 Turning tool
83 Milling tool

The invention claimed is:

1. An electrical tubular heating element for providing electric heat, the electrical tubular heating element comprising:

a tubular metal sheath having an interior; and an electrical heating element positioned within the interior, the electrical heating element constructed of a linear solid elongate resistive wire that extends concentric to a tube axis of the tubular metal sheath, the electrical heating element arranged electrically insulated at least in sections from the tubular metal sheath, the electrical heating element having a base body, the base body comprised of one or more sections of the electrical heating element, each of the one or more sections of the electrical heating element having an essentially constant cross section and two end sections including a first end section and a second end section, the first end section being subjected to a shape-changing machining process so that a cross section of the first end section at least in sub-areas of the first end section is reduced in comparison to the essentially constant cross section of the base body.

2. The electrical tubular heating element according to claim 1, wherein at least one of a connecting wire and a connecting pin is in electrically conductive connection with one of the first and second end sections within the tubular metal sheath.

3. The electrical tubular heating element according to claim 2, wherein the electrically conductive connection with one of the first and second end sections is realized via an end section of the at least one of the connecting wire and the connecting pin, the end section of the at least one of the connecting wire and the connecting pin is subjected to a shape-changing machining process such that the end section of the at least one of the connecting wire and the connecting pin has a complementary shape to a shape of the first end section to which the end section of the at least one of the connecting wire and the connecting pin is connected.

4. The electrical tubular heating element according to claim 2, wherein the base body and the at least one of the connecting wire and the connecting pin, is electrically insulated from the tubular metal sheath by an electrical insulation, the electrical insulation comprised of one of a magnesium oxide powder, a magnesium oxide granulate, and ceramic tubes.

5. The electrical tubular heating element according to claim 4, wherein the electrical insulation is distributed across an entire inner surface of the tubular metal sheath by a single ceramic tube.

6. The electrical tubular heating element according to claim 2, wherein the at least one of the connecting wire and the connecting pin has a base body, the base body of the at least one of the connecting wire and the connecting pin having a cross section that corresponds at least in one section to the cross section of the first end section.

7. The electrical tubular heating element according to claim 6, wherein an outer periphery of a cross section of an assembly formed by the electrical heating element and the at least one of the connecting wires and the connecting pin is constant over an entire area of the assembly, which is arranged within the tubular metal sheath.

8. The electrical tubular heating element according to claim 2, wherein the cross section of the first end section of the electrical heating element tapers in a direction toward an end of the electrical heating element in one of steps and continuously.

9. The electrical tubular heating element according to claim 1, wherein the first end section of the electrical heating element is formed by a projection at an end-side end surface of the base body of the electrical heating element.

10. The electrical tubular heating element according to claim 9, wherein the projection has one of an undercut and a thread.

11. The electrical tubular heating element according to claim 1, wherein an outer contour of the first and second end sections of the electrical heating element correspond to an outer contour of a section of the base body of the electrical heating element, the first end section having one of a recess and an opening that starts from an end-side end of the electrical heating element.

12. The electrical tubular heating element according to claim 11, wherein the one of the recess and the opening has one of an undercut and a thread.

13. The electrical tubular heating element according to claim 2, wherein the electrical heating element is connected with the at least one of the connecting wire and the connecting pin, the electrical heating element is arranged in the interior of the tubular metal sheath and the one or more sections of the electrical heating element are electrically insulated relative to the tubular metal sheath, the first end section is subjected to a shape-changing machining process so that a cross section of the first end section at least in sub-areas of the first end section is reduced in comparison to the essentially constant cross section of the base body.

14. The electrical tubular heating element according to claim 13, wherein before connecting the electrical heating element with the at least one of the connecting wire and the connecting pin at least one end section of the at least one of the connecting wire and the connecting pin is subjected to shape-changing machining complementary to the shape-changing machining process of the first end section.

15. The electrical tubular heating element according to claim 13, wherein the electrical heating element is arranged together with the at least one of the connecting wire and the connecting pin in the interior of the tubular metal sheath.

16. The electrical tubular heating element according to claim 1, wherein the electrical heating element is electrically insulated from the tubular metal sheath by filling the interior with one of a powdered magnesium oxide, a granulate magnesium oxide and a ceramic tube pushed into the interior.

17. The electrical tubular heating element according to claim 2, wherein the electrical heating element is electrically insulated from the tubular metal sheath together with sections of the at least one of the connecting wire and the connecting pin by a single ceramic tube is pushed into the interior.

18. The electrical tubular heating element according to claim 1, wherein the shape-changing machining is performed by one of metal cutting, pressing, and hammering.

19. The electrical tubular heating element according to claim 1, wherein the electrical tubular heating element is compacted one of completely and in sections.

* * * * *